F. L. GODDARD.
SALAD DRESSING MIXER.
APPLICATION FILED FEB. 12, 1912.

1,111,374.

Patented Sept. 22, 1914.

Witnesses:
L. E. Johnston
C. J. Dyckoff

Inventor:
Fred L. Goddard
By his Attorneys,
Merwin & Swenarton.

UNITED STATES PATENT OFFICE.

FRED L. GODDARD, OF NEW YORK, N. Y., ASSIGNOR TO ERNEST M. CURRIER AND HARRY E. ROBY, OF NEW YORK, N. Y., CONSTITUTING THE FIRM OF CURRIER & ROBY, OF NEW YORK, N. Y.

SALAD-DRESSING MIXER.

1,111,374.  Specification of Letters Patent.  Patented Sept. 22, 1914.

Application filed February 12, 1912. Serial No. 677,020.

*To all whom it may concern:*

Be it known that I, FRED L. GODDARD, a citizen of the United States, residing in the city, county, and State of New York, have invented new and useful Improvements in Salad-Dressing Mixers, of which the following is a specification.

My invention relates to improvements in mixing apparatus for thoroughly blending the various ingredients of salad dressing, and has for its objects the provision of a simple, economical and effective means for thoroughly commingling the said ingredients mechanically, being intended as a substitute for the usual manual operation of beating in a saucer or bowl.

In the manual operation of mixing salad dressing and particularly the so-called French dressing, consisting for example of approximately four parts olive oil and one part vinegar with the addition thereof of suitable flavoring ingredients, it is extremely difficult to thoroughly commingle the said ingredients owing to their totally different properties and consistency. Mere beating alone is not sufficient, as is also the mere stirring, owing to the fact that in the first case the oil is broken up into numerous small globules which are distributed throughout the mixture and are noticeably visible therein, and in the second place, the mixture is streaked with ribbons of the different ingredients, *en masse*, without there being any thorough blending of the same.

My invention is fully set forth and described in the following detailed description and drawings forming a part of this specification, in which—

Figure 1:
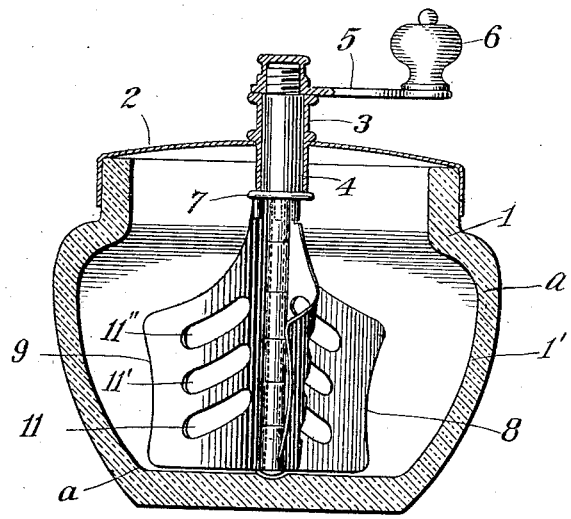
Figure 2:
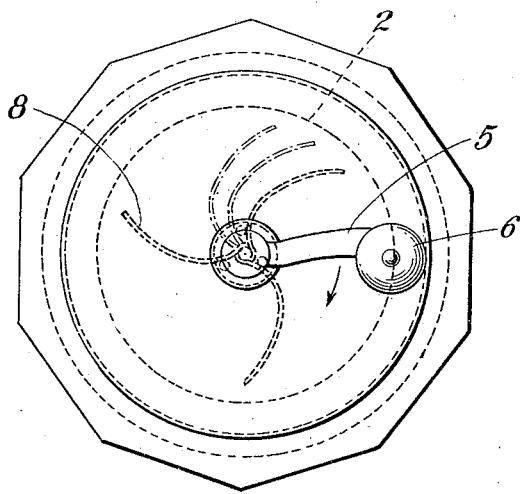

Figure 1 is a vertical central section showing my improved mixing device; and Fig. 2 is a plan view, from above of the same.

Referring to the drawings and the construction shown therein, the reference numeral 1 designates a receptacle or bowl, preferably of glass, although any other suitable material, such as metal or the like, may be employed. The said bowl as shown, is provided with curvilinear inner walls of gradually increasing curvature toward the bottom of the receptacle in order that the mixed liquids will normally tend to flow toward and collect in the bottom of said bowl due to the action of gravity thereon.

The said bowl is closed by a snug fitting top 2, which is provided with a central journal 3, adapted to receive a shaft 4, the latter being connected externally of said bowl with a handle 5, having a knob or hand-grip 6 on the free end thereof. Upon the opposite end of said shaft, and below a ring or bearing 7 formed thereon to prevent vertical movement of said shaft, is mounted a paddle wheel or rotor consisting of three parabolically curved blades 8 all of corresponding size and shape, disposed at equal intervals around said shaft and rigidly secured thereto. Each of said blades as shown is of sufficient extent to substantially contact with the side wall of said bowl at its point of juncture with the bottom thereof as designated by the reference letter *a*. Above this point said blades are of slightly less radial extent being cut away to afford an opening 9 sufficient to admit of the passage therethrough of mixed liquids. The top 10 of the said blades projects radially so as to be substantially coextensive with the lower end thereof. As shown, each blade is provided with a series of three slightly inclined substantially parallel slots 11, 11', 11'', which extend throughout the greater portion of the breadth of said blades. These slots permit of the passage therethrough of the liquids contained in said bowl intermediate the outer edges of said blades. Preferably said slots extend at an angle of approximately 45° to the horizontal and are from $\frac{1}{8}$ to $\frac{1}{4}$ inches in width and $\frac{3}{4}$ inch in length for a blade $1\frac{1}{4}$ inches at the outer edge and 2 inches high from the bottom to the point of contact with the ring 7. The bottom of each of said blades is approximately rectilinear in order that the same can conform to, and substantially contact with, the bottom of said bowl or vessel at a point along said blades.

The operation of the said device is evident from the foregoing description, the same being as follows: The salad dressing, for example a mixture consisting of say four parts of olive oil and one part of vinegar, is introduced into the bowl, the paddle wheel is then inserted therein and the cover applied. The operator then rapidly rotates the said paddle wheel, preferably about 120 revolutions per minute. As a result the liquids will be forcibly thrown together and periodically lifted bodily from the bottom of the receptacle and thrown outwardly against the wall of the vessel or bowl. Also, owing to the concave configuration of the side walls of said vessel and the tendency due to centrifugal force for the liquid to escape to the farthermost point when set in rotation owing to the action of centrifugal force, the liquid will be obviously thrown against the bowl to approximately the point *a*. Any quantity of liquid moreover, intermediate the edges of the said blades is constantly forced through the series of slots in each of said blades, thereby not only is there constant commingling of the liquids in the peripheral layer of the mixture in the bowl, but also the portion in the center of the bowl is likewise repeatedly stirred and commingled.

As shown in the dotted lines in Fig. 2, the blades of the paddle wheel may be jointed with respect to the shaft so as to permit of folding the same, and thereby render it possible to insert the mixing device when folded through the relatively small top aperture of a large container. In such cases it is preferable that the blades be so connected to the shaft that they can open into the position shown in Fig. 1 when the operating handle is rotated in a clock-wise direction, and will be prevented from opening farther, or from collapsing backwardly. When it is desired to remove the mixing device, a few twirls of the operating handle in an anti-clock-wise direction will collapse the blades forwardly and permit of their removal from a mouth of only half the size of the expanse covered by said blades when opened.

Having thus described my invention, what I claim and desire to secure by Letters Patent is:—

A mixer for salad dressing, comprising a container having inner concave walls and an aperture at the top of a smaller cross sectional area than the largest internal cross sectional area of said container, a cover for said container, a mixing device consisting of a shaft adapted to be mounted in bearings formed in said cover and the bottom of said container respectively, a plurality of projecting blades disposed circumferentially about said shaft, and movably mounted with respect thereto, said blades being of sufficient curvature to intersect the radial lines of said container, each of the said blades being hinged on said shaft so as to permit of the same being collapsed and folded upon each other when the said shaft is revolved in one direction and to cause the same to resist folding and be maintained equi-distant from each other when said shaft is revolved in the opposite direction, and each of said blades extending from a point in proximity to the bottom of said container, when inserted therein, to points equally distant above the same, and said blades being provided with a series of upwardly inclined transversely extending apertures, the outer vertical edges of said blades being slightly concave.

In witness whereof, I have hereunto set my hand at the city, county and State of New York, this 9th day of February, 1912.

FRED L. GODDARD.

Witnesses:
ELEANORE S. PETERSON,
H. J. CASSERLY.

---

Copies of this patent may be obtained for five cents each, by addressing the "Commissioner of Patents, Washington, D. C."